(12) United States Patent
Angermann et al.

(10) Patent No.: US 11,975,576 B2
(45) Date of Patent: May 7, 2024

(54) TRAILER COUPLING

(71) Applicant: WESTFALIA-Automotive GmbH, Rheda-Wiedenbrück (DE)

(72) Inventors: Kay Angermann, Döbeln (DE); Bernhard Sielhorst, Rheda-Wiedenbrück (DE); Raphael Gringel, Bielefeld (DE)

(73) Assignee: WESTFALIA-Automotive GmbH, Rheda-Wiedenbrück (DE)

( * ) Notice: Subject to any disclaimer, the term of this patent is extended or adjusted under 35 U.S.C. 154(b) by 616 days.

(21) Appl. No.: 17/282,488

(22) PCT Filed: Sep. 26, 2019

(86) PCT No.: PCT/EP2019/076070
§ 371 (c)(1),
(2) Date: Apr. 2, 2021

(87) PCT Pub. No.: WO2020/069977
PCT Pub. Date: Apr. 9, 2020

(65) Prior Publication Data
US 2021/0354520 A1    Nov. 18, 2021

(30) Foreign Application Priority Data
Oct. 4, 2018 (DE) ...................... 10 2018 124 549.1

(51) Int. Cl.
*B60D 1/24* (2006.01)
*B60D 1/06* (2006.01)
(Continued)

(52) U.S. Cl.
CPC ............... *B60D 1/246* (2013.01); *B60D 1/06* (2013.01); *B60D 1/54* (2013.01); *B60D 1/62* (2013.01);
(Continued)

(58) Field of Classification Search
CPC ... B60D 1/06; B60D 1/54; B60D 1/62; B60D 1/246; H02K 7/116; H02K 11/0094;
(Continued)

(56) References Cited

FOREIGN PATENT DOCUMENTS

| CN | 108012537 A | 5/2018 |
|---|---|---|
| DE | 19711535 A1 | 9/1998 |

(Continued)

OTHER PUBLICATIONS

English Translation of International Search Report dated Dec. 18, 2019; International Patent Application No. PCT/EP2019/076070 filed on Sep. 26, 2019. ISA/EP.

(Continued)

*Primary Examiner* — Tony H Winner
*Assistant Examiner* — Felicia L. Brittman

(57) ABSTRACT

A trailer coupling for a motor vehicle may include a coupling element, which is mounted by a bearing so as to be movable between a usage position, in which for attachment of a trailer the coupling element projects rearwards in front of the rear of the motor vehicle, and a rest position, in which the coupling element is moved closer to the motor vehicle, wherein the bearing has a bearing base which is stationary relative to the motor vehicle and a bearing element which is movably mounted on the bearing base and supports the coupling element, wherein the trailer coupling has an electric drive motor by which the bearing element can be driven relative to the bearing base between the rest position and the usage position, and wherein the drive motor has a stator and an armature that is driven relative to the stator. It is provided that the bearing base and the bearing element form drive components, wherein the stator is arranged on one drive component forming a stator drive component, and the armature is arranged on the other drive component forming an armature drive component.

38 Claims, 4 Drawing Sheets

(51) Int. Cl.
    *B60D 1/54*        (2006.01)
    *B60D 1/62*        (2006.01)
    *H02K 7/116*      (2006.01)
    *H02K 11/00*     (2016.01)

(52) U.S. Cl.
    CPC ......... *H02K 7/116* (2013.01); *H02K 11/0094* (2013.01)

(58) Field of Classification Search
    CPC .. H02P 5/69; H02P 5/695; H02P 5/753; H02P 6/00; H02P 25/00; H02P 25/03; H02P 25/022; H02P 25/062; H02P 25/064
    USPC ...................................................... 280/491.3
    See application file for complete search history.

(56) References Cited

FOREIGN PATENT DOCUMENTS

| DE | 19858978 A1 | 6/2000 | | |
|---|---|---|---|---|
| DE | 102010030828 A1 | 1/2012 | | |
| EP | 2792514 A2 | 10/2014 | | |
| WO | WO-2018065469 A1 | * | 4/2018 | ............... B60D 1/06 |

OTHER PUBLICATIONS

Chinese Office Action dated May 20, 2023; Chinese Application No. 201980065440.6.

* cited by examiner

TRAILER COUPLING

CROSS-REFERENCE TO RELATED APPLICATION

This application is a 35 U.S.C. 371 national stage filing of PCT Application No. PCT/EP2019/076070 filed Sep. 26, 2019, entitled "TRAILER HITCH," which claims priority to German Patent Application No. 10 2018 124 549.1 filed on Oct. 4, 2018, each of which are incorporated herein in their entirety by reference.

The invention relates to a trailer coupling for a motor vehicle having a coupling element, which is mounted by means of a bearing so as to be movable between a usage position in which for attachment of a trailer the coupling element projects rearwards in front of the rear of the motor vehicle, and a rest position, in which the coupling element is moved closer to the motor vehicle, wherein the bearing has a bearing base which is stationary relative to the motor vehicle and a bearing element which is movably mounted on the bearing base, and supports the coupling base, wherein the trailer coupling has an electric drive motor by which the bearing element can be driven relative to the bearing base between rest position and the usage position, and wherein the drive motor has a stator and an armature that is driven relative to the stator.

Such a trailer coupling is described, by way of example, in EP 1 650 059 A1. In order to adjust the coupling element, i.e. a coupling arm, an electric motor is provided mounted laterally on the housing of the trailer coupling, which drives the trailer coupling or its coupling element by means of a spindle drive. The known design is complex and too bulky for many mounting conditions on the motor vehicle.

It is therefore the object of the present invention to provide an improved trailer coupling with a motorised drive concept.

To achieve the object, in a trailer coupling of the aforementioned kind it is provided that the bearing base and the bearing element form drive components, wherein the stator is arranged on one drive component forming a stator drive component and the armature is arranged on the other drive component forming an armature drive component.

The fundamental idea is that the drive motor, as it were, forms an integral part of the trailer coupling, wherein a component of the drive motor, namely the stator or armature, is arranged in a stationary manner on one drive component, for example the bearing base, and the other part of the motor, for example the stator, on the armature drive component and therefore on the bearing element or alternatively the bearing base.

It is advantageously provided that the stator is arranged on the bearing base and the armature on the moveable bearing element. It is also possible that the stator is arranged on the moveable bearing element and the armature on the bearing base.

Through the integration of armature and stator in the basic components of the bearing, namely the bearing base and the moveable bearing element, enclosed, protected designs are, for example, possible. The trailer coupling can also be designed to be compact and space-saving.

A preferred concept which is shown in the drawing, provides that the stator is, as it were, arranged in a stationary manner on the bearing base, so that a power or energy supply to the stator is particularly easy to realise. In particular, on the stator, exciter coils to generate a magnetic field, and suchlike, are arranged which when the stator is arranged on the bearing base can easily be provided with electrical connection lines. But it is also basically possible that, for example, by means of sliding contacts, moveable or flexible cables, or the like, the stator is arranged in the moveable bearing element, i.e. that in principle the armature is arranged on the bearing base, for example a permanent magnet armature, on which the stator, as it were, is supported or rotates relative to the stator by means of its arrangement on the bearing element.

A variant of the invention preferably provides that the armature is arranged in a stationary manner on the armature drive component, for example the bearing element. Therefore the armature does not rotate relative to the armature drive component driven by it and nor does it move linearly.

It is also advantageous if the armature drives the armature drive component, for example the bearing element, without an intermediate gear. In this way a direct drive is realised. With a correspondingly strong torque, which the armature may experience, if, for example, a correspondingly strong exciter coil arrangement or stator coil arrangement is present, no intermediate gear is needed.

But it is also possible that the armature is arranged on the armature drive component, in a moveable and not stationary manner. For example, the armature is rotatably mounted on the armature drive component. The armature can, for example, be rotatably mounted by means of one or more rotary bearings on the armature drive component. But it is also possible that the armature is mounted in a linear fashion on the armature drive component, for example also in order to participate in movements during the locking or stationary fixing of the bearing element on the bearing base. The rotatable mounting or displaceable mounting or the combination of rotary mounting and sliding mounting of the armature on the armature drive component allows, for example, a movement play upon locking or fixing the armature drive component, relative to the stator drive component.

But the rotatable or other movable mounting of the armature relative to the armature drive component is also suitable for an advanced drive concept:

The armature is advantageously movably coupled with the armature drive component, e.g. the bearing element, by means of at least one gear element of a gear, by means of which the armature drives the armature drive component, e.g. the bearing element. Therefore the armature does not directly drive the armature drive component, but does so via a gear element of the gear, e.g. a planetary gear, a hollow wheel or similar. For example, it is possible that the armature can comprise a gear wheel, which runs along a hollow wheel or meshes with a hollow wheel, arranged in a stationary manner on the armature drive component.

It is preferable if the gear is or comprises a planetary gear.

The at least one gear element, by means of which the armature is movably coupled to the armature drive component, comprises or is formed by a planetary gear. It is also possible, however, for the armature to comprise or be formed by or on a sun wheel.

It is advantageous if the armature is arranged on a gear wheel, for example a sun wheel, of a gear or forms or has a gear wheel of a gear.

It is also advantageous if the armature is arranged in an interior of a hollow wheel or other gear wheel of a gear. The hollow wheel or gear wheel is preferably arranged on the bearing element.

A preferred concept provides that the armature forms a rotor which is driveable with respect to the stator about a rotational axis. Therefore, the drive motor is preferably a rotary drive.

But it is also possible that the armature forms a linear armature, that is driveable with respect to the stator along a longitudinal axis or linear axis. In this way the drive motor, for example, forms a linear drive.

At this point it should be noted that a combination of linear drive and rotary drive is quite possible, in order to realise the drive motor arranged according to the invention.

It is also possible that the trailer coupling according to the invention comprises two drive motors, two rotary drive motors, two linear drive motors or rotary drive motor and linear drive motor combinations. This, for example, allows one drive motor, the armature and stator of which are incorporated into the trailer coupling or the bearing element in the bearing base, to rotationally drive the bearing element relative to the bearing base, while the other drive motor, the armature of which is, for example, also incorporated into the bearing element, brings about an axial movement along the rotational axis with respect to the bearing base. Therefore, positive-locking contours on the bearing base and bearing element can, for example, be brought out of and into engagement, to unlock or to fix the bearing base.

It is also possible that the locking device has at least one actuable positive-locking element with a movement component radial to a rotational axis, about which the bearing element is rotatable with respect to the bearing base, which in a fixing position, in which the bearing element with respect to the bearing base is rotationally fixed, is in engagement with at least one mating positive-locking element, and in a release position, in which the bearing element with respect to the bearing base is rotatable, is out of engagement with the at least one mating positive-locking element. For example, the at least one positive-locking element is adjustable by an actuating bevel on an actuating body between the fixing position and the release position. The actuating body is, for example, adjustably mounted along a setting axis running transversally to the radial movement component, in particular in or on a bearing body or shaft body of the bearing base. The actuating body is, for example, a bolt body. The at least one positive-locking element comprises, for example, a ball, and the at least one mating positive locking element a spherical segment or other ball receptacle. The fixing position is, for example, associated with the usage position and/or rest position of the bearing element or coupling element, while the release position allows an adjustment of the bearing element between the usage position and the rest position.

The armature expediently forms an outer armature in the interior of which the stator is arranged. But it is also possible that the armature is arranged in an interior of the stator, as will be known from typical rotary drives.

A preferred concept provides for mounting of the bearing element with respect to the bearing base by means of at least two or more rotary bearings. It is preferred, for example, that the bearing element is mounted with respect to the bearing base about a rotational axis by means of at least two rotary bearings arranged at a longitudinal distance with respect to the rotational axis. The stator is preferably arranged between the rotary bearings. This allows a particularly rigid and stable mounting. But it is also possible that in relation to the rotational axis the stator has a longitudinal distance from the rotary bearings of the bearing element, with which this is mounted on the bearing base.

The trailer coupling expediently has a locking device, with which the bearing element is lockable with respect to the bearing base. For example, positive-locking contours of bearing element and bearing base engage with each other in a locking position or fixing position, but in a release position are removed or disengaged from one another, so that the bearing element is moveable with respect to the bearing base, for example rotatably and/or linearly displaceable.

The locking device can, for example, be designed to provide rotational locking and/or linear locking of the bearing element with respect to the bearing base. By means of the locking device the bearing element and thus the coupling element, for a example coupling arm, can be locked and/or fixed in a stationary manner in relation to the bearing base in the rest position and/or the usage position.

The locking device and/or the actuating body is expediently loaded by a spring arrangement in the direction of the locking position and/or out of the locking position.

The locking device expediently has a motorised locking drive, for example an electric motor, for moving the locking device into the locking position and/or out of the locking position. The locking drive can directly drive the element to be actuated, for example a positive-locking body or an actuating body for positive-locking bodies or for locking bodies, and can therefore be a direct drive. However, it is also easily possible that the motorised locking drive drives the element to be actuated of the locking device, and therefore in turn preferably the actuating body, via a gear, for example a rack gear or similar.

A number of locking positions can be provided for, for example, for locking of the bearing element with respect to the bearing base in the rest position and/or the usage position.

In at least one relative position of the bearing element and bearing base provided for locking the bearing element with respect to the bearing base, for example in the rest position and/or in the usage position, the armature expediently has a movement play with respect to the stator allowing locking. This means, for example, that the coupling element is displaceable relative to the bearing base into a swivel position or linear position, in which locking is possible and/or provided for, for example, a locking in the usage position and/or a locking in the rest position. The locking device can perform the locking, without the drive motor, as it were, being a hindrance. The movement play is, for example, a linear or axial movement play. It can also comprise or be a rotational movement play or a combination of linear movement play and rotational movement play.

It is advantageous if the drive motor, for example its stator, is passed through by at least one component of the locking device or has a receiving space for the component of the locking device. This means, for example, that an actuating body, in particular an actuating pin, and/or a spring loading the actuating body in the direction, for example, of the locking position or the unlocking position or release position and/or a component of the motorised locking drive, for example its armature, passes through the drive motor or engages in the receiving space of the drive motor.

The actuating body serves to actuate at least one locking body and/or one positive-locking element, which engages in a locking position in a locking receptacle or is engaged with a mating positive-locking element.

The actuating body is, for example, linearly and/or rotationally adjustable, in order to move the at least one positive-locking element or the at least one locking body into the locking position and/or out of the locking position.

The at least one positive-locking element is adjustable by means of the actuating body for example radially with respect to a longitudinal axis of the actuating body and/or radially with respect to a swivel axis, about which the bearing element is mounted with respect to the bearing base so as to swivel, between the locking position and the release position. In the locking position the at least one positive-locking element engages in the mating positive-locking element.

It is also advantageous if the drive motor and/or a gear driven by the drive motor for driving the bearing element with respect to the bearing base is arranged between the locking components of the locking device, which lock the bearing element against rotation and/or displacement with respect to the bearing base. This means, for example, that on one longitudinal end area of the drive motor, or the gear, or both, positive locking elements can be provided which lock the bearing element against rotation with respect to the bearing base and on the opposite longitudinal end area of the drive motor, or the gear, or both, positive locking elements can be provided which lock the bearing element against displacement with respect to the bearing base, for example with respect to a rotational axis, about which the bearing element can rotate with respect to the bearing base.

The stator expediently has an exciter coil arrangement. For example, the stator has a laminated core with a plurality of exciter coils, which can be supplied by a power supply device. With the exciter coil arrangement, for example, which can also be referred to as a stator coil arrangement, by supplying power to the exciter coils or stator coils a magnetic rotational field can be generated for driving the rotot.

The armature can, for example, be an armature that similarly has electric coils. In a simple exemplary embodiment the drive motor is then, for example, a universal motor.

However, it is preferred if the armature is, as it were, electrically neutral or requires no connection lines:

A preferred concept provides, for example, for an armature with an arrangement of magnets or a squirrel-cage armature. This means that no electrical lines have to be run to the armature.

The drive motor is expediently an electronically switched drive motor and/or a brushless motor. Such a motor is particularly low-maintenance. However, for the typical usage of a trailer coupling, which even over its lifetime or service life typically experiences only a certain number of movement cycles, a drive motor can also be used which has brushes or similar other components for transferring electrical power from the stator to the armature.

The bearing base advantageously has a receiving space for a power supply device to supply power to the drive motor, e.g. the exciter coil arrangement or stator coil arrangement. This means, for example, that the power supply device is arranged directly in-situ. Naturally, a power supply device can also be provided at another position of the stator-drive component, on which the stator is arranged, for example, on an external wall area of the bearing base.

It is similarly advantageous if the stator-drive component, for example the bearing base, forms or has a protective housing for a power supply device to supply power to the drive motor. This means, for example, that a power supply device comprising power electronics can be arranged directly in situ on the stator drive component. The conductive paths to the exciter coil arrangement of the stator are in this case extremely short and can be mechanically protected from environmental influences in an optimum manner.

It is also advantageous, if the respective drive component encloses or protects the component of the drive motor that is received by it. For example it is advantageous if the stator drive component, e.g. the bearing base, encloses or protects the stator. It is also advantageous, if the armature drive component, e.g. the bearing element, encloses the armature.

It is also possible that the drive motor is fully or partially received in the bearing element, in which a bearing body, for example a bearing shaft, which protrudes from the bearing base, engages and on which the bearing element is mounted so that it can rotate about a rotational axis and/or displace along a linear axis or setting axis, in particular a linear axis.

The drive motor is expediently housed in the bearing of the trailer coupling. The bearing advantageously forms a protective housing for the drive motor.

It is advantageous if the bearing element forms a protective housing for the drive motor. For example, the bearing element has a peripheral wall and an end wall or end face facing away from the bearing base. The drive motor is arranged between the end wall or end face and the bearing base and housed by the peripheral wall.

It is also expedient, if the bearing element has a cover, by which an interior of the bearing element, in which the drive motor is arranged, is sealed or sealable. The cover preferably has a passage opening for a bearing body, which protrudes from the bearing base and is rotatably mounted on the bearing element.

It is also advantageous if a rotational axis of the drive motor, thus a rotational axis, with which the armature is mounted so that it can rotate relative to the stator, and a rotational axis, about which the bearing element is mounted so that it can rotate with respect to the bearing base, is coaxial or parallel.

The drive motor and/or a gear, via which the drive motor drives the bearing element, is advantageously arranged between the bearing base and an end wall or end face of the bearing element facing away from the bearing base. For example, it can be provided that the drive motor together with an epicyclic gear train, planetary gear or similar, is arranged between end walls of the bearing base and the bearing element.

It is also advantageous if both the drive motor and also the gear, via which the drive motor drives the bearing element, are arranged in the protective housing, which in particular is formed by the bearing element. The protective housing is, for example, provided by the bearing element alone or in combination with the bearing base. The protective housing can also be sealed by a cover, which seals the bearing element or an interior of the bearing element.

As the armature is arranged or can be arranged on one component of the bearing base and bearing element and the stator on the other component of the bearing base and bearing element, the following measure is also easily possible:

It is advantageous if the armature is or can be brought into engagement with the stator through assembly of the bearing element on the bearing base. For example, the armature can engage with an interior of the stator or the stator can engage with an interior of the armature, if the bearing element is mounted on the bearing base, for example through a plug-in assembly.

Exemplary embodiments of the invention are explained below using the drawings, wherein.

Where in the description identical or similar components are used, they have the same reference numerals, which in some cases, in order to make a distinction between the exemplary embodiments of FIG. 1 to FIG. 4, FIG. 5, FIG. 6 and FIG. 7 differ in each case one hundred.

Figure 1:
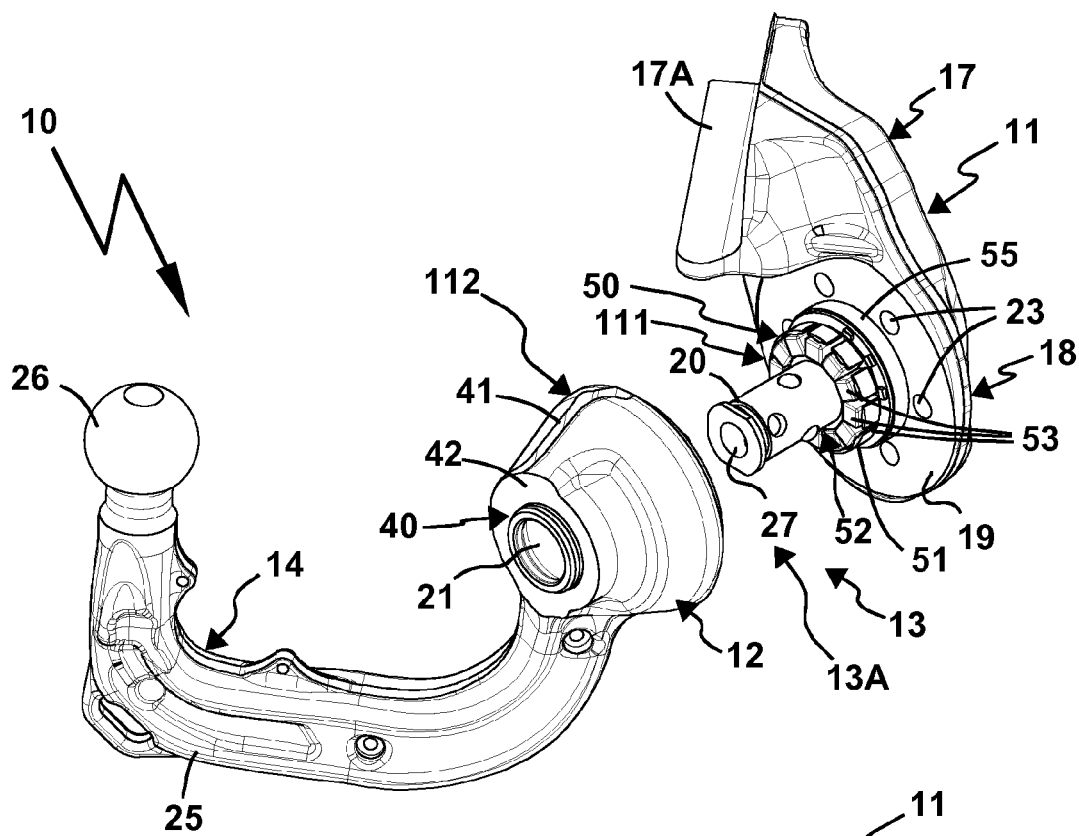
FIG. 1 is an exploded view of a trailer coupling.
Figure 2:
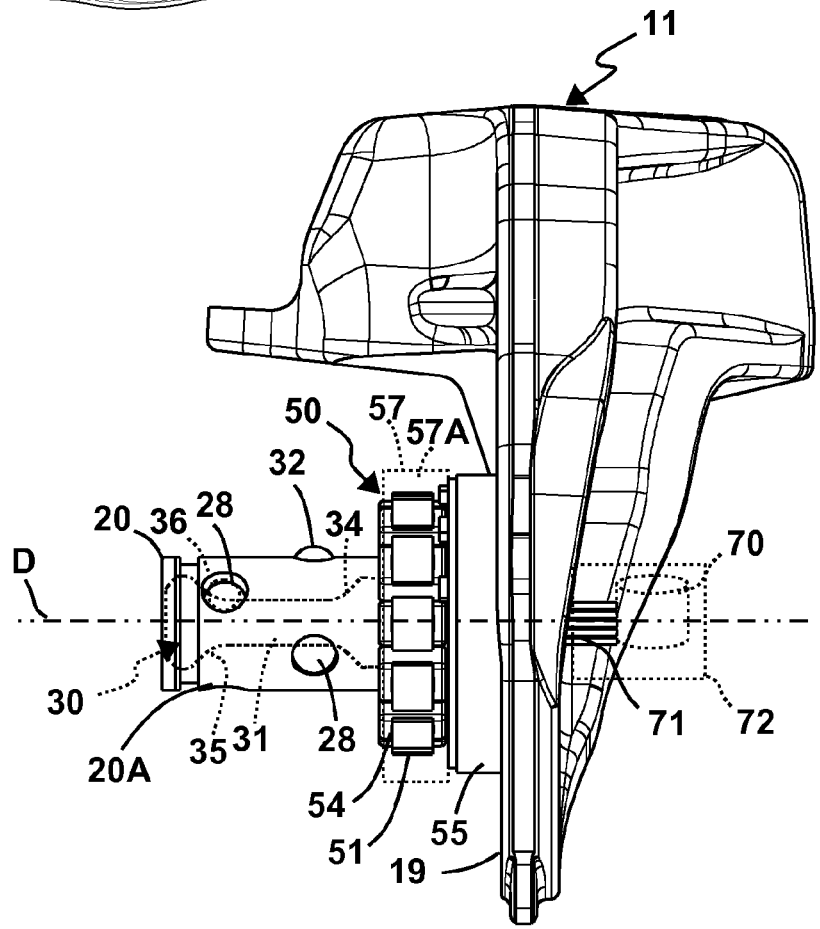
FIG. 2 is a side view of a bearing base of the trailer coupling according to FIG. 1.
Figure 3:
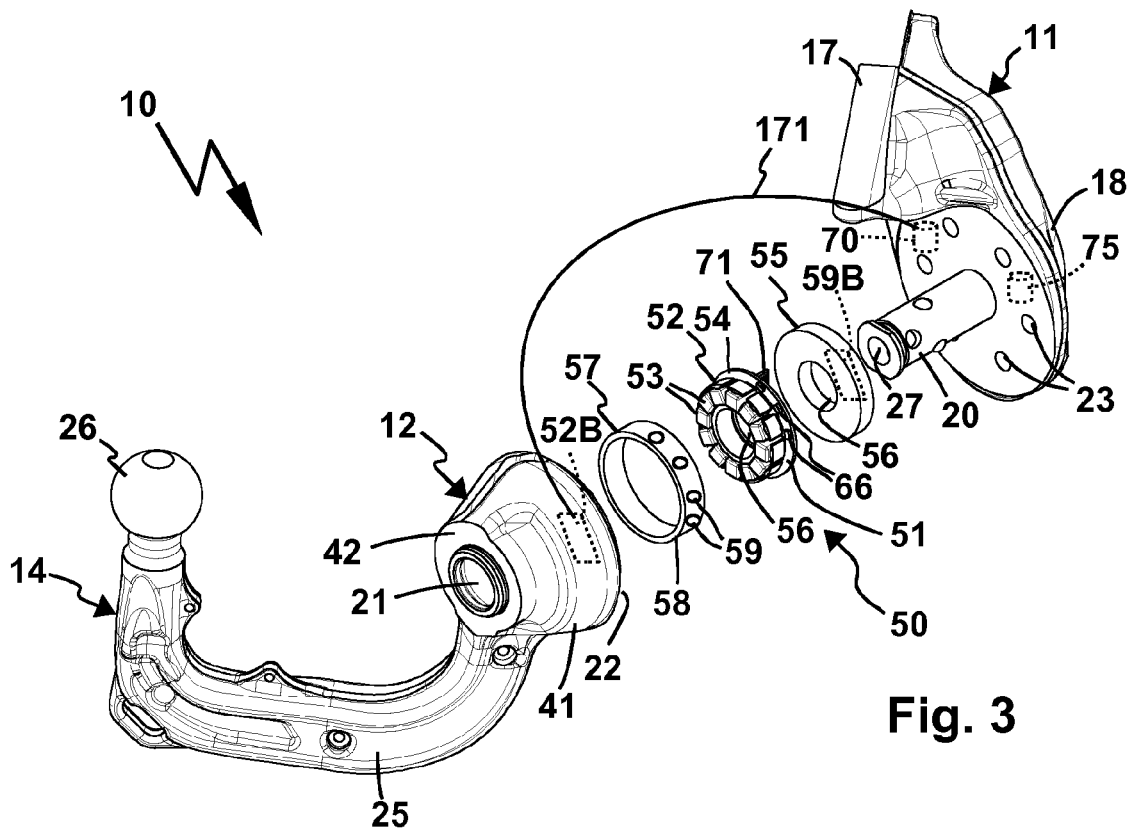
FIG. 3 is a perspective exploded view of the trailer coupling according to FIG. 1.
Figure 4:
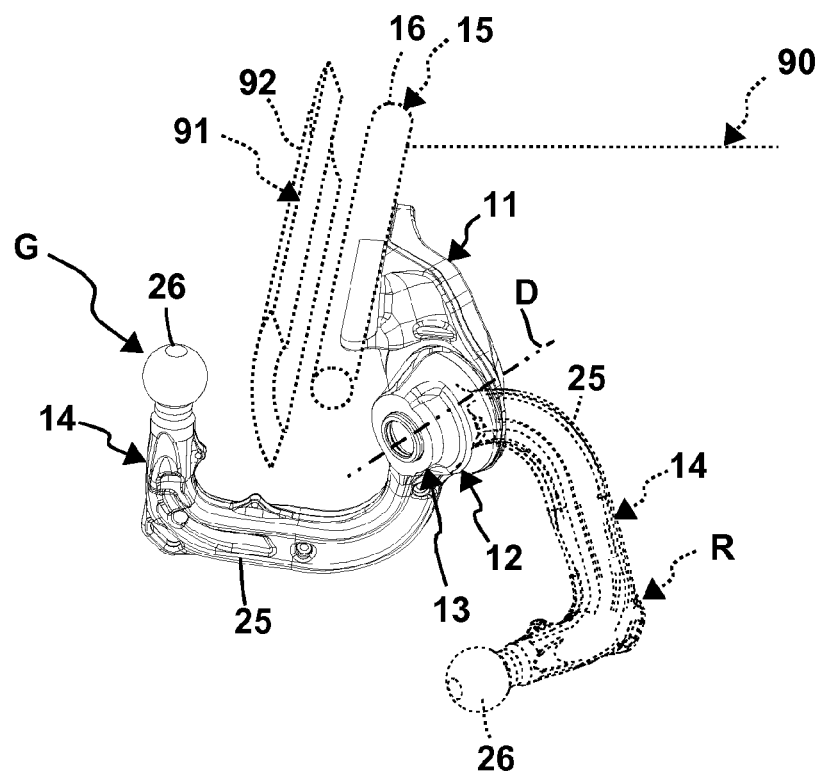
FIG. 4 is the trailer coupling according to FIGS. 1-3 in perspective view with its coupling element, which is displaced between two positions.

Trailer couplings 10, 110, 210, 310 according to FIG. 1 to FIG. 4, FIG. 5, FIG. 6 and FIG. 7, in each case have a bearing base 11, on which a bearing element 12 is mounted so that it can rotate about a rotational axis D. The bearing base 11 and the bearing element 12 form a component part of a bearing 13, 113 with which a coupling arm 14, thus a coupling element 14, which is mounted so as to move between a usage position G and a rest position R, is mounted so that it can move with respect to the bearing base 11, for example in front of the rear 91.

The bearing base 11 is secured to a motor vehicle 90, for example a passenger car. For example, the trailer coupling 10 has a carrier assembly 15 with a crossmember 16, which extends transversally on the rear 91 of the motor vehicle 90 and preferably is arranged hidden below its bumper 92. The crossmember 16 is or can be secured with side members or other mountings not shown in the drawing to bodywork of the motor vehicle 90. In this way, the trailer coupling 10 can easily be a retrofitted trailer coupling, thus a trailer coupling, which can be retrofitted to existing motor vehicles that do not yet have a trailer coupling.

The bearing base has, for example, a support section 17, on which a receptacle 17A for the crossmember 16 is provided. A screw connection, welded connection or similar other securing of the bearing base 11 to the crossmember 16 is not shown in the drawing for reasons of simplicity. A bearing section 18 protrudes from the support section 17. The bearing section 18 has a support surface 19 for the bearing element 12 and a bearing body 20, for example a shaft body 20A, for rotatable mounting of the bearing element 12. The bearing section 18 is, for example, plate-like. The bearing element 12 protrudes at right-angles from the support surface 19.

The shaft-like bearing body 20, which can also be referred to as a hollow shaft body (which will become even clearer in the following), engages in a bearing seat 21 extending along the rotational axis D of the bearing element 12, so that the bearing element 12 is able to rotate about the rotational axis D on the bearing base 11.

The bearing seat 21 extends away from a support surface 22 of the bearing element 12, with which the bearing element 12 can be supported on the support surface 19 of the bearing base 11. On the support surfaces 19, 22 positive locking elements 23 and mating positive-locking elements 24, for example ball guides and balls, teeth or similar other positive locking elements positively engaging with one another, are provided. Through an axial displacement of the bearing element 12 relative to the bearing base 11 along the rotational axis D, which in relation thereto forms a linear axis, the positive locking elements 23 can be brought into engagement with the mating positive-locking elements 24 and out of engagement with these. If the positive locking elements 23, 24 engage with one another, the trailer coupling 10 is locked and/or fixed in a stationary manner in the rest position R and/or usage position G, thus in a fixed position. If the positive locking elements 23 are brought out of engagement with the mating positive-locking elements 24, this corresponds to a release position, in which the bearing element 12 can be rotated relative to the bearing base 11 about the rotational axis D.

The coupling element 14 protrudes from the bearing element 12. The coupling element 14 comprises, for example, an arm section 25, which is connected at one end with the bearing element 12, in particular as a single piece, and at the other free end, carries a coupling body 26, for example a coupling ball. In the usage position G at least the coupling body 26 protrudes from the rear 91 of the motor vehicle 90, so that at that point on the coupling body 26 a trailer, load carrier or the like can be coupled. In the rest position R, on the other hand, the coupling body 26 is moved closer to the rear 91 of the motor vehicle 90. In the rest position R the coupling element 14 is preferably fully or substantially hidden behind and/or below the bumper 92.

In the usage position G and the rest position R, the bearing element 12 is lockable with respect to the bearing base 11 in respect of a displacement along the rotational axis D by means of a locking device 30, so the positive locking elements 23, 24 are kept in engagement.

The locking device 30 comprises an actuating body 31, for example a kind of bolt or bolt body, which serves for actuation of locking bodies 32, for example balls or similar other positive locking elements. The actuating body 31 is mounted so that it can displace axially in a movement space 27, for example a hollow space, of the bearing body 20 along a setting axis S axially, for example parallel to the rotational axis D.

Through the axial displacement of the actuating body 31 this locking body 32 moves into a locking receptacle 33, which is arranged on the bearing element 12. The locking receptacle 33 comprises, for example, a groove, individual, discrete receptacles, for example ball guides, for the locking body 32, or similar. For actuation of the locking body 32 an actuating bevel 34, for example a wedge slope or similar, is provided on the actuating body 31.

The locking bodies 32 form, for example, positive-locking elements 32A, which engage in counter positive-locking elements 33A, namely the locking receptacle 33, in order to fix the bearing element 12 relative to the bearing base 11 axially and/or non-rotatably relative to the setting axis S or rotational axis D.

If the locking receptacles 33 are designed as receptacles, in which the locking bodies 32 are rotationally movable about the setting axis S or rotational axis D, an axial fixing of the bearing element 12 relative to the bearing base 11 relative to the setting axis S or rotational axis D is realised.

If, for example, the locking receptacles 33 are designed as receptacles, in which the locking bodies 32 are rotationally movable not about the setting axis S or rotational axis D, a rotational fixing of the bearing element 12 relative to the bearing base 11 relative to the rotational axis D or setting axis is realised. Here a combination of this, as it were, radial fixing with the abovementioned axial fixing is possible, if in particular the mating positive-locking elements 33A block or prevent a movement of the positive-locking elements 32A along the setting axis S or rotational axis D.

The actuating body 31 can however also serve to drive the bearing element 12 from the bearing base 11 in the sense of the moving apart of the positive locking elements 23, 24 along the rotational axis D. To this end the actuating body 31, by means of one or more release slopes 35, acts on the at least one unlocking body 36, for example at least one ball, which is arranged on an unlocking bevel 37, arranged in a stationary manner on the bearing element 12, in order to drive this away from the bearing base 11.

The locking body 32 and the unlocking body 36 are movably mounted in bearing receptacles 28 of the shaft-like bearing body 20, so that when impinged upon by the actuating body 31 they arrive radially outwards in front of an outer circumference of the bearing body 20 and thus are effectively actuable in the locking receptacle 33 or on the unlocking bevel 37. The locking receptacle 33 and the unlocking bevel 34 which, for example, can be provided on a slot or circumferential groove, can be a single piece with the bearing element 12 or on an in particular sleeve-shaped carrier 12a arranged thereon.

It is advantageous, if a spring 38 moves the actuating bodies 31 into the locking position, in which the locking bodies 32 engage in the locking receptacle 33. The spring 38 is, for example, supported on a support body 29 or support section of the bearing base 11. The support body 29 is, for example, fixedly connected with the bearing base 11 or forms an integral part thereof. The support body 29 is, for example, designed as a sleeve-shaped body, having a base wall or support surface for the spring 38.

The locking device 30 is actable to release the actuating body 31 or to displace it in the direction of the release position or unlocking position, in which the locking body 32 through the bearing receptacles 28, for example drill holes through the bearing body 20, radially inwards in the direction of the actuating body 31 or the movement space 27. In the release position or unlocking position the locking bodies 32 no longer engage in the locking receptacle 33. In the release position or unlocking position the locking bodies 32 no longer engage in the locking receptacle 33.

The locking device 30 can be manually actuable, e.g. by means of a handle and/or actuating pull 139 arranged on the actuating body 31.

Figure 5:
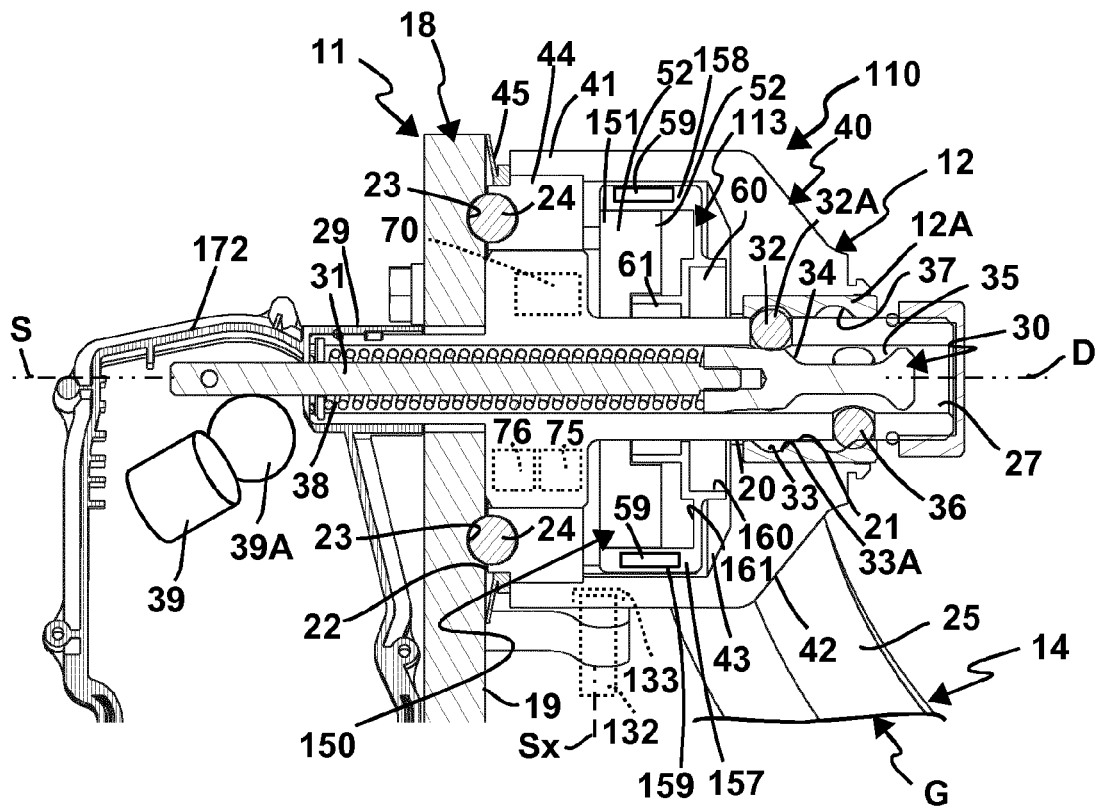
FIG. 5 is a sectional view of a further exemplary embodiment of a trailer coupling.
Figure 6:
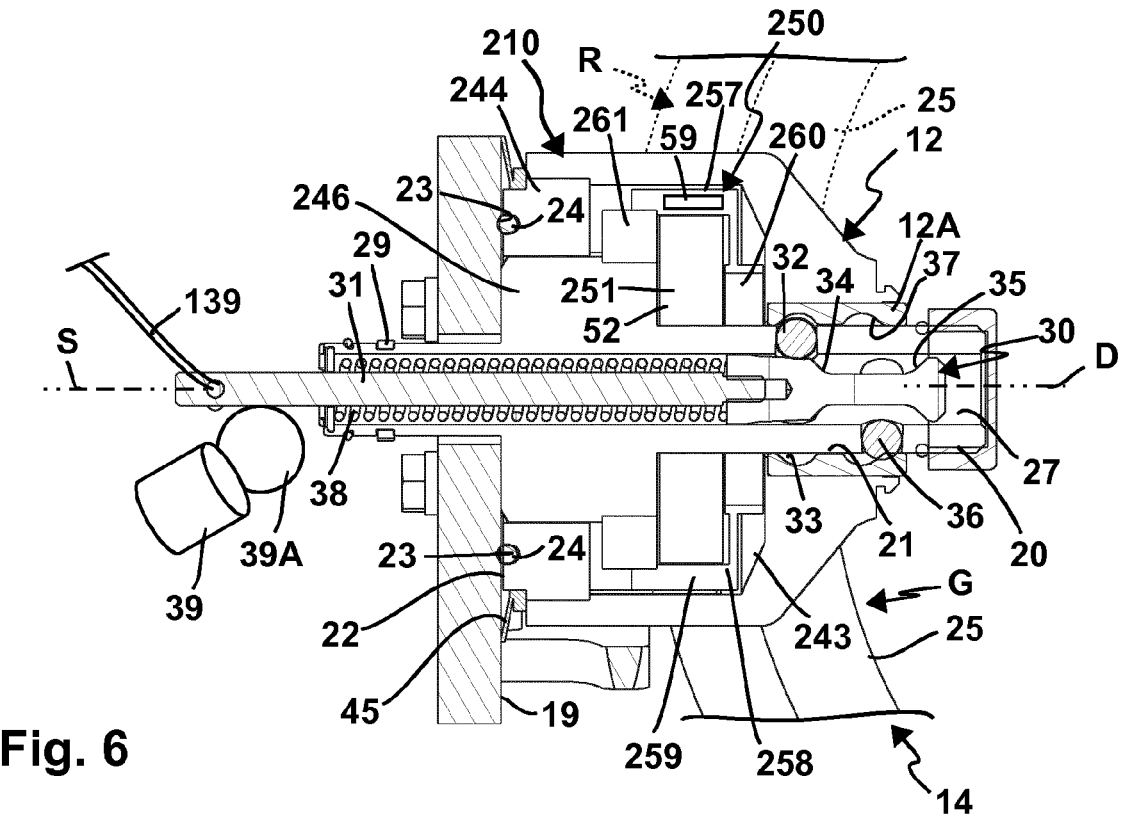
FIG. 6 is a sectional view of a further exemplary embodiment of a trailer coupling.
Figure 7:
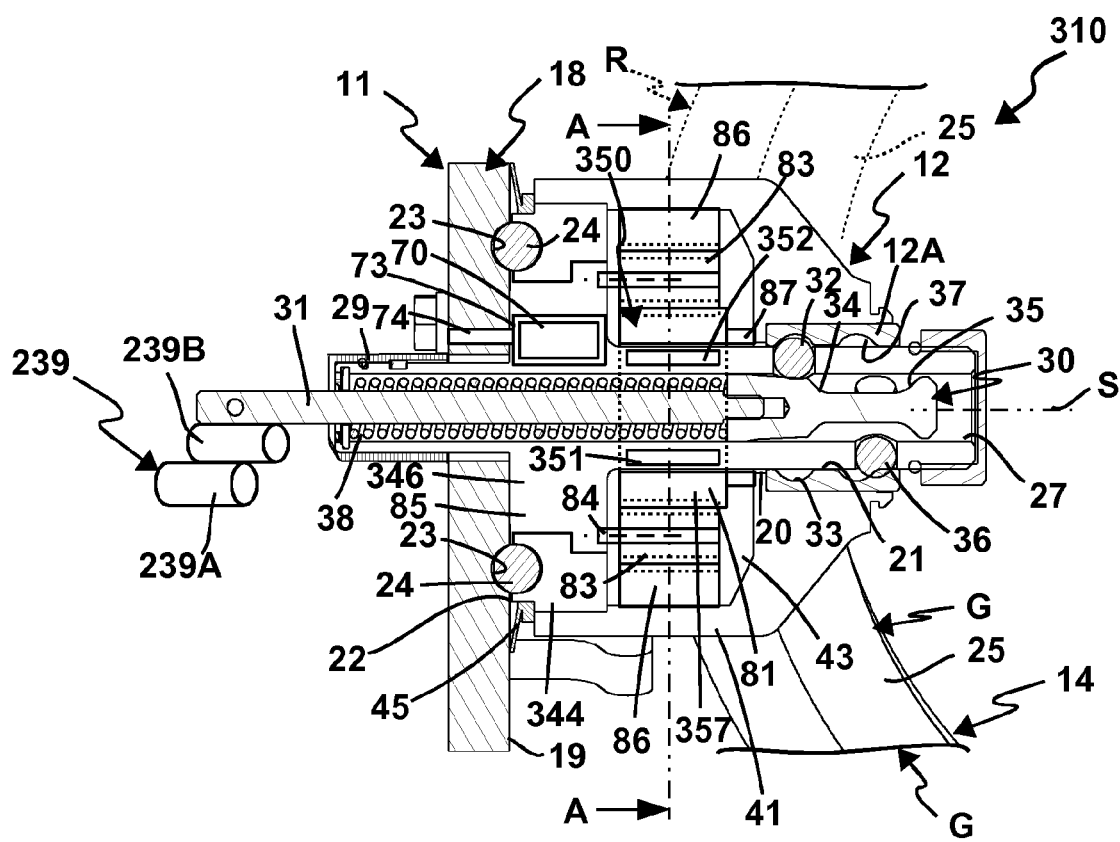
FIG. 7 is a sectional view of a further exemplary embodiment of a trailer coupling.
Figure 8:
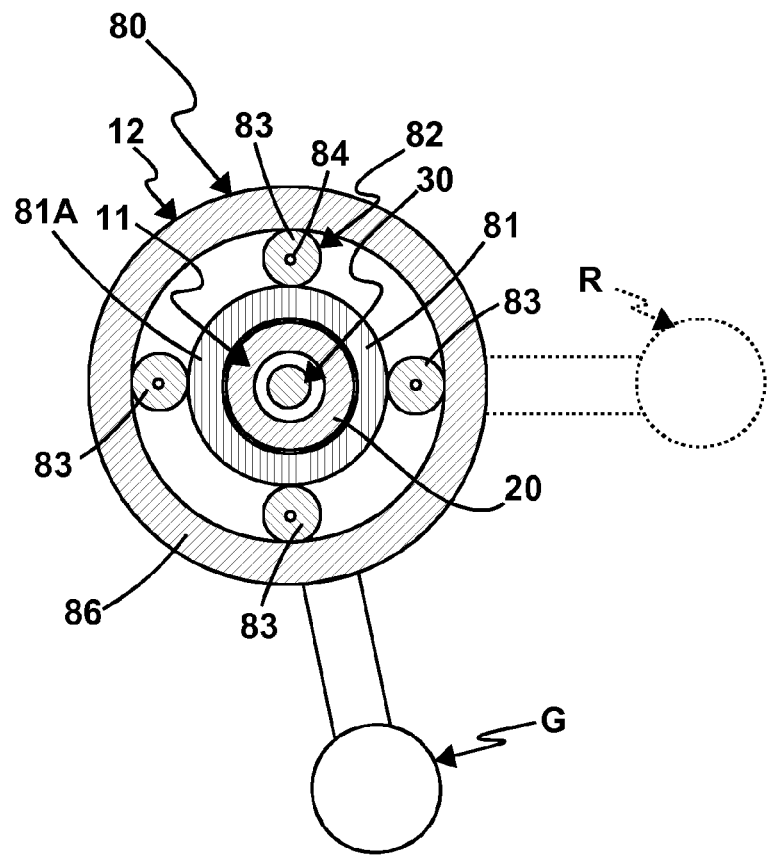
FIG. 8 is a cross-sectional view through the trailer coupling of FIG. 7 approximately along a line of intersection A-A.

However, a motorised drive concept is preferred, for example by means of a locking drive 39 (shown schematically in FIG. 5, FIG. 6 and FIG. 7). The locking drive 39 acts, for example, via a gear, for example a drive wheel 39A (in FIG. 5 and FIG. 6), in particular a gear wheel, on the actuating body 31. Present on the actuating body 31, is or are, for example, a tooth contour or teeth, not shown in the drawing, for the drive wheel 39A.

Alternatively a direct drive may also be provided, for example a locking drive 239 (FIG. 7). Advantageously a stator 239A of the locking drive 239 is stationary with respect to the bearing base 11, while an armature 239B of the locking drive 239, for example a magnet arrangement with one or more permanent magnets, is arranged on the actuating body 31.

The locking concept described above is known, for example, from EP 1 475 253 A1.

Naturally, other locking concepts can also be used, for example bolts, balls or similar other locking bodies. For example, a locking body 132 is mounted on the bearing base 11 and can be brought into engagement with a locking receptacle 133 of the bearing element to lock this relative to the bearing base, e.g. is displaceable along a setting axis SX.

For the trailer couplings 10, 110, 210, 310, convenient, but compact and reliable drive concepts are realised with drive motors 50, 150, 250, 350:

The drive motor 50 comprises a stator 51 with an exciter coil arrangement 52. The exciter coil arrangement 52 can also be referred to as a stator coil arrangement 52. The stator 51 is fixed to the bearing base 11 in a stationary manner.

The exciter coil arrangement 52 contains a plurality of exciter coils 53 arranged in a circular fashion around a motor rotational axis of the drive motor 50, which here corresponds to the rotational axis D. The exciter coils 53 are, for example, arranged on a laminated core or other exciter coil carrier 54. A carrier 55, for example a circular carrier, is used to retain the exciter coil arrangement 52. The bearing body 20 is passed though by a passage opening 56 of the stator, the inner peripheral surface of which rests, for example, on the outer circumference of the bearing body 20, but may also be spaced apart from this. The carrier 55 is supported by the support surface 19. For example, the carrier 55 is glued, screwed or similar to the support surface 19.

An armature 57 of the drive motor 50 is, for example, designed as a rotor 57A, that is rotatably mounted about the rotational axis D.

The armature 57 comprises, for example, a ring body 58. The ring body 58 can, for example, comprise a magnet arrangement with one or more permanent magnets 59, or be a squirrel-cage armature or similar. The armature 57 is fixed to the bearing element 12 in a stationary manner, for example glued, welded, held by positive locking, or similar. So, if the armature 57 is set in rotational motion, it takes the bearing element 12 with it.

Preferably the bearings 13, 113 form bearing arrangements 13A, with which the armature 57 relative to the stator 51 is rotatably mounted about the rotational axis D.

In the mounted state of the bearing element 12 on the bearing base 11, the armature 57 extends to the outer circumference of the exciter coil arrangement 52 and thus of the stator 51, thereby forming an outer armature.

Relative to the rotational axis D, which at the same time represents the setting axis S of the locking device 30, along which the bearing element 12 is displaceable with respect to the bearing base 11, the armature 57 and the stator 51 are in alignment if the locking device 30 adopts its unlocked position. Therefore, a rotating magnetic field generated by the exciter coil arrangement 52 that is stationary with respect to the bearing base 11, is able to act optimally on the armature 57 and drive this.

A power supply device 70 serves to supply power or electrical energy to the exciter coil arrangement 52. The power supply device 70 comprises, for example, a bridge circuit with a plurality of bridges, to which the exciter coils 53 are connected, so that one or more of the exciter coils 53 can be supplied with power by the power supply device 70 and in the exciter coils 53 an electrical rotary field rotating about the rotational axis D and therefore driving the armature 57 is generated. The power supply device 70 is, for example, electrically connected by means of electrical lines 71 with the exciter coil arrangement 52.

It is also advantageous if the trailer coupling 70 has, for example, a control device 75, for example in order to control and/or monitor the locking drive 39, 239 and/or the drive motor 50. The control device 75 can, for example, block the drive motor 50 when the locking drive 39, 239 is actuated and conversely when the drive motor 50 is actuated block the locking drive 39, so that either a locking or unlocking of the trailer coupling 10 or a swivel movement or setting movement between the rest position R and the usage position G takes place and/or is possible.

The control device 75 can, for example, by means of one or more sensors 76 detect a respective position of the bearing element 12 with respect to the bearing base 11, for example a rotational position with respect to the rotational axis D and/or a linear position with respect to the setting axis S, here therefore similarly the rotational axis D, in order to control the locking drive 39, 239 and the drive motor 50.

The control device 75 and the power supply device 70 can form a single module or a single, integral device.

A preferred concept provides that the control device 75 and the power supply device 70 are arranged on the bearing base 11.

For example, a receiving space is present on the bearing base 11, in particular behind the support surface 19, in which the power supply device 70 and/or the control device 75 are arranged.

The power supply device 70 and/or the control device 75 can, however, also be arranged on the outside of the carrier arrangement 15 or on the main body of the bearing base 11.

Preferably a protective housing 72 is provided, in which the power supply device 70 and/or the control device 75 are protectively arranged.

The drive motor 50 is also optimally protected. The bearing element 12 is arranged in an interior 43, which therefore forms a protective housing 40. The interior 43 is delimited by a peripheral wall 41, which extends about the rotational axis D, and by an end wall 42, on which, for example, the sleeve-shaped carrier 12A is arranged.

The coupling element 12 is, for example, arranged on the peripheral wall 41 and/or protrudes from the peripheral wall 41.

The power supply device 70 or the control device 75 can easily also be arranged, for example, in a protective housing 172 of the trailer coupling 110. The locking drive 39 of the locking device 30 is, for example, arranged in the protective housing 172.

From the exemplary embodiment of the trailer coupling 110 it is also clear that a cavity for the control device 75 and/or the power supply device 70 is directly supported on the bearing base or in the bearing base 11 or also on a bearing element thereof, for example on a foot section 46 of the bearing body 20, with which this is supported on the bearing section 18. The foot section 46 is, for example, designed in the manner of a flange body.

A bearing concept of the drive motor 50 or the trailer coupling 10 provides that the bearing element 12 is mounted, for example, by means of the ring body 12A on the bearing body 20. In addition the carrier 55, for example, forms a bearing.

It is also easily possible that the carrier 55 on its outer circumference rotatably supports a bearing ring of a roller bearing, for example of a ball bearing or a rolling bearing, which is fixedly connected to the bearing element 12. This means that the bearing element 12 is rotatably mounted firstly on the free end region of the bearing body 20 and secondly on its foot section in the region of the support surface 19. The drive motor 50 is arranged between these two mounting points.

The interior 43 is therefore sealed at one end by the carrier 55 and at the other by the end wall 42 and the peripheral wall 41 and therefore forms a protective housing 40 for the drive motor 50.

But the sealing concept or closure concept, which is realised on the trailer coupling 110, can basically also be realised on the trailer coupling 10:

With the trailer coupling 110 the interior 43 is sealed by a cover 44, having a passage opening for the bearing body 20, for example the foot section 46 thereof. The cover 44 and the end wall 42 delimit the interior 43 at the end face, and the peripheral wall 41 circumferentially.

The peripheral wall 41 delimits, for example, a plug-in receptacle, in which the cover 44 is inserted. The cover 44 is advantageously fixedly and in particular in a sealing manner connected to the peripheral wall 41, for example glued, welded or similar.

On the cover 44 the positive locking elements 24 can be arranged.

Additional sealing, in particular in an intermediate space between the support surface 19, 22, when these are pushed apart in the unlocking position of the locking device 30, is provided by a seal 45, for example by a sealing lip, a sealing ring or similar, extending around the cover 44. The seal 45 also creates a seal for the drive motor 50.

A drive motor 150 of the trailer coupling 110 forms a bearing 113, with which the bearing element 12 is rotatably mounted on the bearing base 11.

The armature 157 of the drive motor 150 is rotatably mounted on the bearing body 20. To this end, rotary bearings 60, 61 are provided which, on the one hand are supported by the shaft-like bearing body 20, and on the other by the armature 157. The rotary bearings 60, 61 are, for example, ball bearings, sliding bearings, roller bearings, rolling bearings or similar.

The armature 157 has a ring body 158, on the peripheral wall 159 extending in a circular manner about the rotational axis D of which permanent magnets 59 are arranged. On a base wall or end wall, on the outer circumference of which the peripheral wall 159 is arranged, bearing receptacles 160, 161 for the rotary bearings 60, 61 are arranged. The rotary bearing 60 has, for example, a larger diameter than the rotary bearing 61.

The bearing 113 can be the bearing with which the bearing element 12 is exclusively mounted on the bearing base 11, meaning that no further rotary bearing is present between the bearing element 12 and the bearing base 11.

Other mountings or mounting points are also possible, however:

A further mounting of the bearing element 12 with respect to the bearing base 11 of the trailer coupling 110 can optionally be realised between the cover 44 on the one side and the bearing body 20, for example its foot section 46.

Bearing in the region of the sleeve-shaped carrier 12A between the bearing element 12 and the bearing base 11 is also easily possible.

On the bearing base 11, in particular on the outer circumference of the bearing body 20, a stator 151 of the drive motor 50 is arranged. The stator 151 has, for example, the exciter coil arrangement 52 already described.

It is possible for the stator 151 to have a receptacle, in which the rotary bearing 61 engages. Therefore a large axial support length with respect to the rotational axis D or the motor rotational axis of the drive motor 150, with which the armature 157 is supported with respect to of the stator 151, is realisable. This means that with the drive motor 150 a concept is realised with which the armature 157 while being an outer armature, which is essentially arranged on the outside of the stator 151, nevertheless engages in an interior of the stator 151, namely in the region of the rotary bearing 61.

The stator 151 is supported, for example, on the outer circumference of a shaft section of the bearing body 20, which protrudes from foot section 46. At the end face the stator 51 can be supported by the end face of the foot section 46 facing the shaft section of the bearing body 20.

The drive motor 250 is housed like the drive motor 150 in the protective housing 40 formed by the bearing element 12. An interior 243 of the bearing element 12 is sealed by a cover 244 in the type of the cover 44, which has a passage opening or insertion opening for the bearing body 20, in particular its foot section 246. In the exemplary embodiment of the trailer coupling 210 the positive locking elements 23 and the mating positive-locking elements 24 have a somewhat smaller design, but are functionally identical to the above exemplary embodiments.

On the outer circumference of the foot section 246 a rotary bearing 261 is supported, on a shaft section of the bearing body 20 protruding from the foot section 246 a rotary bearing 260 is supported. Between the rotary bearings 261, 260 is the stator 251, which, for example, comprises the exciter coil arrangement 52, which can be supplied via a power supply in the type of the power supply device 70 which for simplification is not shown for the trailer coupling 210.

The rotary bearings 260, 261 rotatably support the armature 257, therefore an armature of the drive motor 250 with respect to its motor rotational axis or rotational axis D. The armature or armature 257 has a ring body 258 with a peripheral wall 259, on which an arrangement of a plurality of permanent magnets 59 is arranged, extending in a circular manner about the rotational axis D. The peripheral wall 259 is supported on the one hand on the rotary bearing 261, and on the other by an end wall extending away from the peripheral wall 259 on the rotary bearing 260. The stator 251 and thus also the exciter coil arrangement 52 are thereby housed by the rotary bearings 260, 261 and the peripheral wall 259 as well as part of the abovementioned end wall.

The drives 50, 150, 250 are direct drives, which directly drive the bearing element 12 with respect to the bearing base 11, therefore without an intermediate gear.

Conversely, with the trailer coupling 310 a gear 80 is provided, via which the drive motor 350 drives the bearing element 12 about the rotational axis D.

The gear 80 and the drive motor 350 are fully housed in the bearing element 12, and therefore protected from environmental influences. This concept has already been explained and is, for example, realised in that the interior 41 of the bearing element 12 is sealed by a cover 344 in the type of the cover 44, 244.

Here the gear 80 is designed as a planetary gear.

The stator 351 of the drive motor 350 is arranged in a stationary manner on the bearing base 11. For example, an exciter coil arrangement 352 in the type of the exciter coil arrangement 52 is arranged on the shaft section of the bearing body 20. On this, for example, a laminated core can be provided directly with a plurality of exciter coils in the type of the the exciter coils 53 which can be supplied by a power supply device 70.

The power supply device 70 is arranged in a cavity 73 of a foot section 346 of the bearing body 20. From the cavity 73, for example, a cable channel 74 extends through the bearing plate or the bearing section 18 of the bearing base 11, through which electrical lines, for example for supplying power to the power supply device 70, for control of this or similar, can run.

An armature 357 and thus an armature of the drive motor 350 is mounted rotatably with respect to the bearing element 12, namely by means of a rotary bearing 87.

The armature 357 bears or at the same time forms a sun wheel 81 of the gear 80, or is arranged on the sun gear 81. The sun wheel 81 forms a gear wheel 81A of the gear 80.

The sun wheel 81 meshes with one or more planetary gears 83 of a planetary gear set 82, which is rotatably mounted on a planet gear carrier 85, namely by means of bearing elements 84, for example bearing shafts. On the bearing elements 84 roller bearings, for example needle bearings, ball bearings, rolling bearings or similar, can be provided, with which the planetary gears 83 are mounted. Naturally the bearing element 84 can also be rotatably mounted with respect to the planetary gear carrier 85, for example, by means of sliding bearings, roller bearings or similar.

The planetary gear carrier 85 is arranged in a stationary manner on the bearing base 11. For example, the bearing elements 84 are arranged on the foot section 346 of the bearing body 20. The foot section 346 can, for example, form the planetary gear carrier 85.

The axes of rotation of the planetary gears 83 are parallel to the rotational axis D, about which the bearing element 12 is rotatably mounted with respect to the bearing base 11.

The bearing elements 84 protrude, for example, from an end face of the foot section 346 facing towards the bearing body 20.

The planetary gears 83 in turn mesh with a hollow wheel 86, which is arranged on the bearing element 12 or formed by the bearing element 12. For example, the hollow wheel 86 is arranged or formed on an inside or inner wall surface of the peripheral wall 41 facing towards the bearing body 20.

In the abovementioned exemplary embodiments the bearing base 11 is a stator drive component 111, on which the respective stator 51, 151, 251, 351 of the drive motors 50-350 is arranged, while the armature 57, 157, 257, 357 is arranged on the bearing element 12 forming an armature drive component 112.

However, a kind of design reversal is also easily possible, such that, for example, on the trailer coupling 110, instead of the exciter coil arrangement 52, a magnet arrangement 59B is arranged on the bearing base 11, while on the bearing element 12 exciter coil arrangement 52B is arranged, which can be supplied by the power supply device 70, for example via a supply line 171. The supply line 171 accompanies the movement of the bearing element 12 with respect to the bearing base 11.

The drive motors 50-350 can not only be designed as rotary drives, but also as linear drives, for example in order to displace the bearing element 12 with respect to the bearing base 11 along the setting axis S.

This allows the drive motors 50-350 to realise the linear movement sequentially to the rotational movement already described, for example in order to bring the positive locking elements 23-24 out of engagement and into engagement, but also to realise superimposed rotational and linear movements, for example for displacing the coupling element 14 between the rest position R and the usage position G.

The invention claimed is:

1. A trailer coupling for a motor vehicle having a coupling element, which is mounted by a bearing so as to be movable between a usage position in which for attachment of a trailer the coupling element projects rearwards from in front of the rear of the motor vehicle, and a rest position, in which the coupling element is moved closer to the motor vehicle, wherein the bearing has a bearing base which is stationary relative to the motor vehicle and a bearing element which is movably mounted on the bearing base, and supports the coupling element, wherein the trailer coupling has an electric drive motor by which the bearing element can be driven relative to the bearing base between the rest position and the usage position, and wherein the drive motor has a stator and an armature that is driven relative to the stator wherein the bearing base and the bearing element form drive components, and wherein the stator is arranged on one drive component forming a stator drive component and the armature is arranged on the other drive component forming an armature drive component.

2. The trailer coupling according to claim 1, wherein the armature is mounted in a stationary manner on the armature drive component, and/or the armature drives the armature drive component without an intermediate gear and/or directly.

3. The trailer coupling according to claim 1, wherein the armature is movably mounted on the armature drive component.

4. The trailer coupling according to claim 3, wherein the armature is movably coupled to the armature drive component by at least one gear element of a gear, by the armature drives the armature drive component.

5. The trailer coupling according to claim 4, wherein the gear comprises a planetary gear.

6. The trailer coupling according to claim 4, wherein the at least one gear element comprises or is formed by a planet gear.

7. The trailer coupling according to claim 4, wherein the armature comprises or is formed by a sun wheel.

8. The trailer coupling according to claim 1, wherein the armature forms a rotor, which with respect to the stator is driveable about a rotational axis and/or in that the armature forms a linear armature, which with respect to the stator is driveable along a longitudinal axis.

9. The trailer coupling according to claim 1, wherein the armature forms an outer armature, in the interior of which the stator is arranged.

10. The trailer coupling according to claim 1, wherein the armature is arranged in an interior of the stator.

11. The trailer coupling according to claim 1, wherein the bearing element in relation to the bearing base is rotatably mounted about a rotational axis.

12. The trailer coupling according to claim 1, wherein the bearing element in relation to the bearing base is mounted displaceably along a setting axis.

13. The trailer coupling according to claim 12, wherein the setting axis and the rotational axis are coaxial or identical.

14. The trailer coupling according to claim 1, wherein the bearing element with respect to the bearing base is mounted rotatably about a rotational axis by at least two rotary bearings arranged at a longitudinal distance with respect to the rotational axis, between which a stator is arranged.

15. The trailer coupling according to claim 1, further comprising a locking device, with which the bearing element with respect to the bearing base (11) is lockable or fixable in a stationary manner in the usage position and/or the rest position.

16. The trailer coupling according to claim 15, wherein the armature with respect to the stator in at least a relative position of the bearing element with respect to the bearing base provided for locking by the locking device has a movement play allowing the locking and unlocking.

17. The trailer coupling according to claim 16, wherein the movement play is a linear movement play along a rotational axis, about which the bearing element with respect to the bearing base is rotatably mounted.

18. The trailer coupling according to claim 15, wherein the drive motor, is passed through by at least one component of the locking device for actuating at least one locking body or positive-locking element, or has a receiving space for the component of the locking device.

19. The trailer coupling according to claim 15, wherein the drive motor and/or a gear driven by the drive motor for driving the bearing element with respect to the bearing base is arranged between the bearing element with respect to the locking components of the locking device locking the bearing base in a non-rotatable and/or non-displaceable manner.

20. The trailer coupling according to claim 15, wherein the locking device has at least one positive-locking element arranged in particular in a stationary manner on the bearing base and at least one mating positive-locking element arranged in a stationary manner on the bearing element, which through axial displacement of the bearing element along a rotational axis, about which the bearing element is rotatably mounted with respect to the bearing base, can be displaced between a fixing position, in which the at least one positive-locking element and the at least one mating positive-locking element are in engagement, and a release position, in which the at least one positive-locking element and the at least one mating positive-locking element are out of engagement, wherein the bearing element relative to the bearing base with respect to the rotational axis is fixed against rotation in the fixing position and in the release position is rotatable.

21. The trailer coupling according to claim 15, wherein the locking device has at least one actuable positive-locking element with a movement component radial to a rotational axis, about which the bearing element is rotatable with respect to the bearing base, which is adjustable between a fixing position, in which the bearing element with respect to the bearing base is rotationally fixed and in which the positive-locking element is in engagement with at least one mating positive-locking element, and a release position, in which the bearing element with respect to the bearing base is rotatable and the at least one positive-locking element is out of engagement with the at least one mating positive-locking element.

22. The trailer coupling according to claim 1, wherein the stator has an exciter coil arrangement or stator coil arrangement.

23. The trailer coupling according to claim 1, wherein the armature has an exciter coil arrangement or is a squirrel-cage armature.

24. The trailer coupling according to claim 1, wherein the drive motor is an electronically switched drive motor and/or a brushless motor.

25. The trailer coupling according to claim 1, wherein the stator drive component, has a receiving space for a power supply device for supplying power to the drive motor and/or forms a protective housing for a power supply device for supplying power to the drive motor.

26. The trailer coupling according to claim 1, wherein the stator-drive component, encloses the stator, and/or in that the armature drive component, encloses the armature and/or in that the drive motor is housed in the bearing or the bearing, forms a protective housing for the drive motor.

27. The trailer coupling according to claim 1, wherein the armature with respect to the stator by a bearing arrangement is rotatably mounted, wherein the bearing arrangement forms in full or in part the bearing, with which the bearing element is rotatably mounted on the bearing base.

28. The trailer coupling according to claim 1, wherein a rotational axis of the drive motor and a rotational axis, about which the bearing element is rotatably mounted with respect to the bearing base, are coaxial or parallel.

29. The trailer coupling according to claim 1, wherein the drive motor and/or a gear, via which the drive motor drives the bearing element, is arranged between the bearing base and an end wall or end face of the bearing element facing away from the bearing base.

30. The trailer coupling according to claim 1, wherein the drive motor and/or a gear, via which the drive motor drives the bearing element, are received in a protective housing formed by the bearing element or arranged on the bearing element.

31. The trailer coupling according to claim 1, wherein the bearing element in relation to the bearing base is exclusively rotatably mounted by bearings of the drive motor.

32. The trailer coupling according to claim 1, wherein the armature can be or is brought into engagement with the stator through mounting of the bearing element on the bearing base.

33. The trailer coupling according to claim 1, wherein the stator is arranged on a bearing body rotatably mounting the bearing element about a rotational axis.

34. The trailer coupling according to claim 33, wherein the bearing body protrudes from the stator and/or passes through the stator and/or in that the stator is arranged in a circular manner about the bearing body.

35. The trailer coupling according to claim 33, wherein in the bearing body an actuating body of a locking device, that is provided for stationary fixing or locking of the bearing element with respect to the bearing base in the usage position and/or the rest position, is received in a linearly displaceable manner.

36. The trailer coupling according to claim 1, wherein the bearing element and the drive motor are arranged on the same side of the bearing base.

37. The trailer coupling according to claim 1, wherein the armature is arranged on a gear wheel, of a gear or forms a gear wheel of a gear.

38. The trailer coupling according to claim 37, wherein the armature is arranged in an interior of a gear wheel in a stationary manner on the bearing element.

* * * * *